Figure 1:
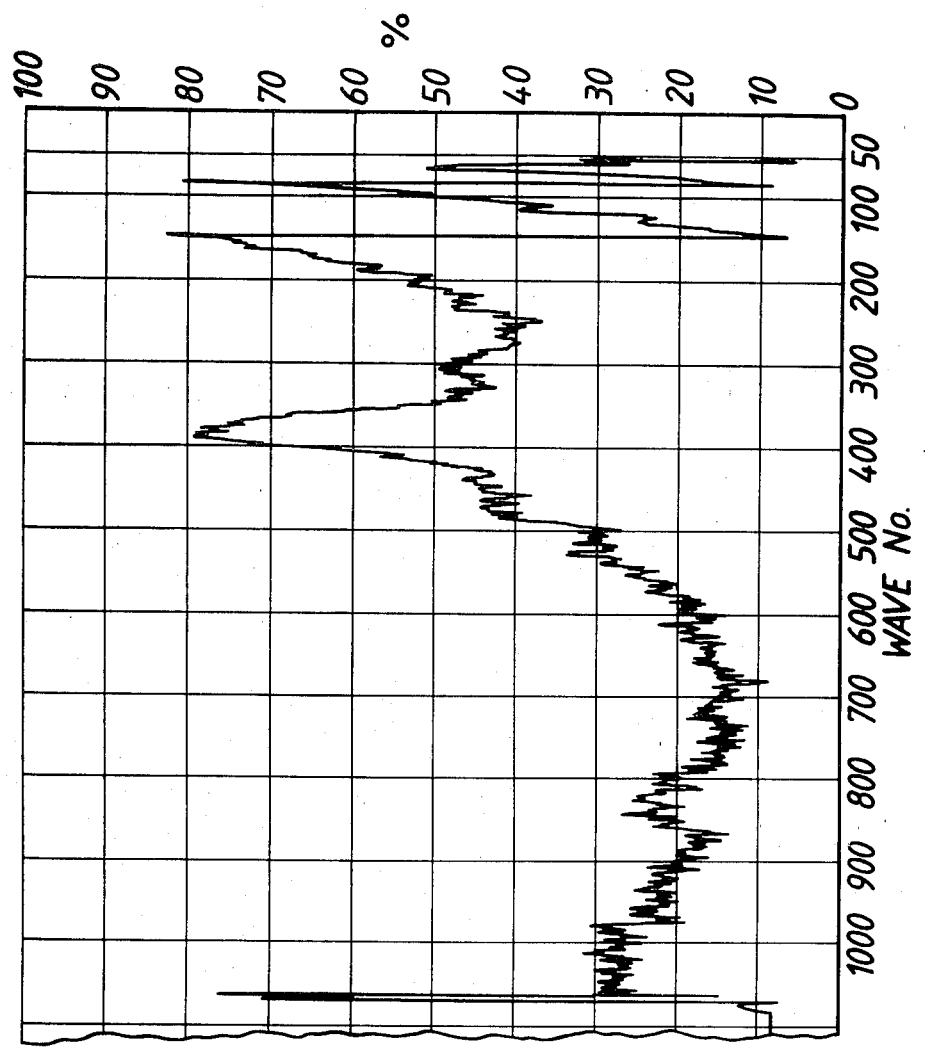

United States Patent [19]

Ball et al.

[11] 4,407,728

[45] Oct. 4, 1983

[54] METHOD FOR PRODUCING CRYSTALLINE ALUMINOSILICATES AND THEIR USE AS CATALYSTS AND CATALYST SUPPORTS

[75] Inventors: William J. Ball, Capel; Keith W. Palmer, Weybridge; David G. Stewart, Epsom, all of England

[73] Assignee: The British Petroleum Company Limited, London, England

[21] Appl. No.: 230,814

[22] Filed: Feb. 2, 1981

Related U.S. Application Data

[63] Continuation-in-part of Ser. No. 969456, Dec. 14, 1978, abandoned.

[30] Foreign Application Priority Data

Dec. 23, 1977 [GB] United Kingdom ............... 53645/77
Jul. 27, 1978 [GB] United Kingdom ............... 31636/78

[51] Int. Cl.³ ............................................. C01B 33/28
[52] U.S. Cl. .................................... 502/60; 260/448 C; 423/328; 423/329; 502/202; 502/214
[58] Field of Search ................................ 423/328-330; 260/448 C; 252/431 N, 455 Z, 432, 437

[56] References Cited

U.S. PATENT DOCUMENTS

| | | | |
|---|---|---|---|
| 3,130,007 | 4/1964 | Breck | 423/328 |
| 3,702,886 | 11/1972 | Argauer et al. | 423/328 |
| 4,089,929 | 5/1978 | Christophliemk et al. | 423/118 |
| 4,151,189 | 4/1979 | Rubin et al. | 423/329 X |
| 4,175,114 | 11/1979 | Plank et al. | 423/329 |
| 4,275,047 | 6/1981 | Whittam | 423/329 |

FOREIGN PATENT DOCUMENTS

| | | | |
|---|---|---|---|
| 1955095 | 9/1970 | Fed. Rep. of Germany | 423/329 |
| 2746844 | 4/1979 | Fed. Rep. of Germany | . |
| 1365318 | 8/1974 | United Kingdom | 423/329 |

*Primary Examiner*—Edward J. Meros
*Attorney, Agent, or Firm*—Brooks, Haidt, Haffner & Delahunty

[57] ABSTRACT

The invention relates to a method for preparing a crystalline aluminosilicate having a high silica to alumina molar ratio and an X-ray diffraction pattern substantially the same as that of ZSM-5 zeolite which method comprises mixing a source of silica, a source of alumina, a source of alkali metal, water and at least one alkanolamine according to Formula (I):

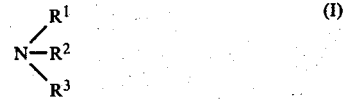

wherein any two of $R^1$, $R^2$ and $R^3$ are independently alkylol groups and the remaining one of $R^1$, $R^2$ and $R^3$ is a hydrogen atom or all of $R^1$, $R^2$ and $R^3$ are independently alkylol group, the alkylol groups being —CH$_2$—R—OH, wherein R is —CH$_2$—, —CH$_2$CH$_2$—, or —CH(CH$_3$)—, the ratio of said source of silica to said source of alumina being at least 20:1 based on the equivalent moles of silica and alumina in said respective sources, maintaining said mixture at a temperature above about 120° C. and recovering the crystalline aluminosilicate formed.

23 Claims, 4 Drawing Figures

METHOD FOR PRODUCING CRYSTALLINE ALUMINOSILICATES AND THEIR USE AS CATALYSTS AND CATALYST SUPPORTS

This application is a continuation-in-part of application Ser. No.: 969,456 filed on Dec. 14, 1978, now abandoned.

The present invention relates to a method for preparing aluminosilicates useful as catalyst supports and with, or without, further modification as conversion catalysts. More particularly this invention relates to a method for preparing crystalline aluminosilicates having a high silica to alumina ratio and a ZSM-5 X-ray diffraction (XRD) pattern from a reaction mixture containing one or more alkanolamines or their precursors.

Aluminosilicates, both natural and synthetic, have been shown to contain a wide variety of positive ions. These aluminosilicates are rigid three-dimensional networks of $SiO_4$ and $AlO_4$ in which the tetrahedra are crosslinked by the sharing of oxygen atoms whereby the ratio of the total aluminium and silicon atoms to oxygen is 1:2. The electrovalence of the tetrahedra containing aluminium is balanced by the inclusion of a cation in the three dimensional structure. This cation in the initially formed aluminosilicate is generally an alkali metal. Typical of this type of aluminosilicate is zeolite Y which has a characteristic XRD pattern and the chemical composition:

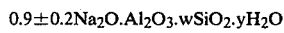

$$0.9\pm0.2Na_2O.Al_2O_3.wSiO_2.yH_2O$$

in which w is a number between 3 and 6 and y has a value up to 9, as described in German Patent specification No. 1955095. In this synthesis triethanolamine is added for the purpose of reducing the crystallisation time though it also facilitates the use of lower silica to alumina molar ratios in the crystallisation mixture than are normally employed for the production of zeolite Y.

It has also been proposed to include in the aluminosilicate organic nitrogen cations notably quaternary ammonium cations such as tetramethylammonium, tetraethylammonium, tetrapropylammonium and tetrabutylammonium. Inorganic cations can be exchanged either in their entirety or partially by another type of cation utilising ion exchange techniques in a conventional manner. On the other hand, due to pore size limitations, organic cations are not necessarily susceptible to further cation exchange. In the hydrated form molecules of water occupy the spaces between the tetrahedra.

In the past, techniques of synthesising aluminosilicates have involved the use of solutions containing a source of silica, alumina, alkali metal and the cation in the form in which it would exist in the synthesized aluminosilicate. This method became rather expensive with the advent of crystalline aluminosilicates containing tetraalkylammonium cations. The synthesis of these aluminosilicates involved the addition of expensive quaternary ammonium cations to a reaction mixture in order to obtain the desired aluminosilicate. Furthermore in order to exchange an ammonium or other cation into the aluminosilicate prior to producing the active form of the catalyst it was necessary to calcine the aluminosilicate to decompose the quaternary ammonium cation.

A range of crystalline aluminosilicates having a "high", that is 10:1 or more, silica to alumina molar ratio, high stability, extremely high acidity and the ability to catalyse many kinds of conversion reactions are prepared from one or more quaternary alkylammonium compounds in U.S. Pat. No. 3,702,886. The crystalline aluminosilicates prepared from tetrapropylammonium hydroxide in that patent were designated ZSM-5 zeolites and their X-ray diffraction patterns were given. However the use of quaternary alkylammonium compounds is not without its disadvantages, not the least of which is their high cost. British Patent Specification No. 1,365,318 discloses an attempt to overcome this disadvantage by employing in the synthesis the precursors of the tetraalkylammonium compound, i.e. $R_1R_2R_3N+R_4X$ in which $R_1$, $R_2$ and $R_3$ are selected from aryl, substituted aryl, alkyl, substituted alkyl, cycloalkyl, substituted cycloalkyl and hydrogen, $R_4$ is alkyl, substituted alkyl, cycloalkyl, substituted cycloalkyl, aryl and substituted aryl and X is an electronegative group. This method only partially alleviates the expense problem and does not eliminate a further disadvantage associated with crystalline aluminosilicates prepared from tetraalkylammonium compounds, namely that in order to exchange an ammonium or other cation into the aluminosilicate preliminary to producing the active form it is necessary to calcine the aluminosilicate.

British Pat. No. 1,471,440, claiming a method for synthesising a crystalline aluminosilicate zeolite containing an organic nitrogen cation, wherein a reaction mixture comprising sources of silica, alumina and alkali metal, water and a primary amine having 2 to 10 carbon atoms is prepared and maintained under conditions of temperature and pressure to effect crystallisation of said aluminosilicate zeolite, purports to overcome the disadvantages inherent in the aforesaid methods for synthesising crystalline aluminosilicates. The Examples in the complete specification describe the use of a wide variety of primary amines in the preparation of crystalline aluminosilicates and the use of a few unsubstituted secondary amines in the preparation of both crystalline and amorphous aluminosilicates.

In accordance with our invention it has been found that crystalline aluminosilicates having a high silica to alumina ratio and an X-ray diffraction pattern which is characteristic of the ZSM-5 zeolites can be prepared without an organic cation contained therein from one or more alkanolamines or precursors thereof, which materials are readily available on an industrial scale.

According to the present invention there is provided a method for preparing a crystalline aluminosilicate having a high silica to alumina molar ratio and an X-ray diffraction pattern substantially the same as that of ZSM-5 zeolite, which method comprises mixing a source of silica, a source of alumina, a source of alkali metal, water and at least one alkanolamine according to Formula (I):

(I)

wherein any two of $R^1$, $R^2$ and $R^3$ are independently alkylol groups and the remaining one of $R^1$, $R^2$ and $R^3$ is a hydrogen atom or all of $R^1$, $R^2$ and $R^3$ are independently alkylol groups, the alkylol groups being $-CH_2-R-OH$, wherein R is $-CH_2-$, $-CH_2CH_2-$, or —CH(CH$_3$)—, the ratio of said source of silica to said source of alumina being at least 20:1 based on the equivalent moles of silica and alumina in said respective sources, and maintaining said mixture at a temperature of about 120° C. or 135° C. or more for a time such that crystallisation occurs.

Suitable sources of silica include, for example sodium silicate, silica hydrosol, silica gel, silica sol and silicic acid. The preferred source of silica is an aqueous colloidal dispersion of silica particles. A suitable commercially available source of silica is LUDOX Colloidal Silica manufactured by Du Pont (LUDOX is a Registered Trade Mark).

Suitable sources of alumina include, for example sodium aluminate, aluminium sulphate and alumina. The preferred source of alumina is sodium aluminate prepared by dissolving alumina particles in excess sodium hydroxide solution.

Suitable sources of alkali metal include alkali metal hydroxides and alkali metal oxides. Preferably the alkali metal is sodium.

It will be appreciated that each source of silica, alumina and alkali metal can be supplied by one or more initial reactants and then mixed together in any order. For example sodium silicate is a source of both sodium and silica.

Suitably the alkanolamine of formula (I) may be for example diethanolamine, dipropanolamine, triethanolamine or tripropanolamine. Diethanolamine has been found to be especially useful.

Alkanolamines having the formula (I) are generally prepared by the reaction of an alkylene oxide with ammonia. The reaction may be represented as follows:

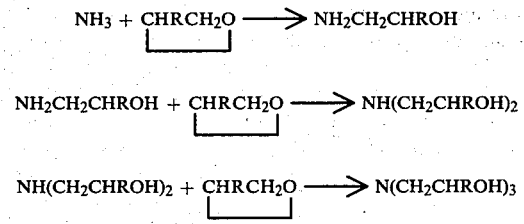

wherein R is either an H atom or a methyl group. Thus in practice reaction of ammonia with an alkylene oxide produces a mixture of mono-, di- and trialkanolamines which may be separated by fractionation techniques well-known in the art. Generally the monoalkanolamine can readily be separated leaving a mixture of the di- and trialkanolamine, which mixture may be used as such in the process of the present invention.

The reaction of ammonia and an alkylene oxide is exothermic and is usually carried out at a temperature in the range 50° to 100° C. and a pressure in the range 150 to 300 psi. The reaction may be carried out, at controlled temperature and pressure, either in a coil-type reactor by continuously pumping aqueous ammonia and alkylene oxide into the coil, or in a kettle-type reactor by slowly pumping the alkylene oxide into the ammonia solution contained in the agitated kettle. Because water aids temperature control by removing reaction heat it is advantageous to use aqueous ammonia at a concentration of 25 to 50%, although processes using low concentrations of water or anhydrous processes may be employed. The relative proportions of mono-, di- and trialkanolamines that can be obtained by the above procedure is dependent upon the ratio of ammonia to alkylene oxide used. A large excess of alkylene oxide over the stoichiomeric amount required for formation of the monoalkanolamine favours the formation of the di- and trialkanolamine. Control of the final products may also be achieved by a recycle technique, wherein an excess of the monoalkanolamine is added to the ammonia/alkylene oxide reaction mixture. The addition of excess monoalkanolamine makes it possible to suppress the formation of this material and to obtain, as a reaction product, a mixture consisting almost entirely of di- and trialkanolamines.

Alkylene oxides will react with nearly all nitrogen compounds having one or more hydrogen atoms attached to the nitrogen. Thus a number of mixed alkanolamines can be made by reacting ethylene oxide with, for example, diisopropanolamine or by reacting propylene oxide with diethanolamine under the conditions hereinbefore described for the reaction of an alkylene oxide with ammonia.

Alkylene oxides, such as ethylene oxide and propylene oxide, and ammonia are readily available on an industrial scale and di- and triethanolamine are relatively inexpensive materials when compared with primary amines, for example.

Furthermore, and this is a particular advantage of the present invention, we have found that the desired crystalline aluminosilicates can be prepared from the precursors of di- and triethanolamine or propanolamine without the need to isolate the alkanolamines themselves, thereby effectively eliminating a step in the production process if so desired.

Thus a preferred embodiment of the present invention provides a method for preparing a crystalline aluminosilicate having a high silica to alumina molar ratio which method comprises mixing a source of silica, a source of alumina, a source of alkali metal, water and the precursors of at least one alkanolamine according to formula (I) said precursors consisting of ethylene oxide or propylene oxide and a nitrogen-containing compound having one or more hydrogen atoms attached to a nitrogen atom selected from the group consisting of ammonia, monoethanolamine, monopropanolamine, diethanolamine and dipropanolamine, the ratio of said source of silica to said source of alumina being at least 20:1 based on the equivalent moles of silica and alumina in said respective sources, and maintaining said mixture at a temperature of about 120° C. or 135° C. or more for a time such that crystallisation occurs.

The nitrogen compound having one or more hydrogen atoms attached to a nitrogen atom may be, for example, ammonia or an ethanolamine or a propanolamine. Preferably the nitrogen compound is ammonia or a monoalkanolamine. The ammonia may be added as a gas or as an aqueous ammoniacal solution. The molar ratio of alkylene oxide to nitrogen compound may vary within wide limits, though a ratio in the range 10:1 to 2:1 is preferred.

The mixing may be effected by passing one or other or both the alkylene oxide and the nitrogen compound in the form of a vapour into an aqueous mixture containing the remainder of the reactants. Alternatively, the alkylene oxide and the nitrogen compound are preferably added in the form of liquids to the aqueous mixture containing the source of silica, the source of alumina and the source of the alkali metal.

In a preferred method of preparation an aqueous monoalkanolamine solution is mixed with an aqueous solution of an alkylene oxide and the resulting mixture is further mixed with a source of silica, a source of alumina, a source of alkali metal and water and the mixture so-formed maintained under reaction conditions which effect formation of the aluminosilicate. In this embodiment of the invention it is believed that the formation of the aluminosilicate proceeds through the intermediate formation of the di- and trialkanolamines.

Whether the alkanolamine of formula (I) is added as such or in the form of its precursors, conditions which effect the formation of the crystalline aluminosilicate are identical. Thus the temperature is preferably in the range from about 120° to 210° C., even more preferably in the range from about 135° to 190° C. However, as is well known in the art the use of particularly advantageous conditions, such as seeding i.e. the introduction of a small amount of the desired crystalline material, may allow the use of lower temperatures if so desired. The pressure may suitably be autogenous pressure, that is the pressure generated at the temperature employed, though pressures above autogenous pressure and as high as 400 psig may be used. Preferably the pressure may range from about autogenous to 250 psig. The mixture may suitably be maintained under the aforesaid conditions for a time not less than 4 hours, preferably at least 20 hours. Generally a time of about 48 hours will be found suitable though times up to and in excess of 7 days may be employed. Of course the crystallisation time should not be so protracted that the crystalline aluminosilicate produced is converted to quartz.

The sources of silica, alumina and alkali metal, water and alkanolamine of Formula (I) or mixture thereof may be mixed in quite wide proportions. The ratio of the source of silica to the source of alumina, based on the equivalent moles of silica and alumina in the respective sources, should be at least 20:1, preferably in the range from 20:1 to 150:1 and even more preferably in the range from 20:1 to 100:1. The ratio of the number of moles of alkali metal to the number of mole equivalents of total silica and alumina in the sources of silica and alumina may be in the range from 2:1 to 0.02:1, preferably from 1:1 to 0.1:1. The ratio of the number of moles of alkanolamine of formula (I) to the number of mole equivalents of total silica and alumina in the sources of silica and alumina may suitably be in the range from 10:1 to 0.02:1, preferably from 10:1 to 0.1:1. Although the amount of water present in the mixture is not critical to the performance of the invention it is well known in the art that there must be sufficient water present to dissolve the reagents and not so much that the mixture is too dilute for crystallisation to occur.

The reaction is suitably carried out in a closed vessel capable of withstanding the elevated pressures generally employed. Furthermore the mixture is preferably agitated during crystallisation of the aluminosilicate. The crystalline aluminosilicate so-produced is preferably separated from the mother liquor by filtration and thereafter is preferably washed, suitably with water at a temperature in the range, for example, of from 15° to 95° C.

Crystalline aluminosilicates prepared by the method of the invention may be used as catalysts or as catalyst supports. The crystalline aluminosilicate may be used on its own or admixed with up to 80% by weight of another support material such as silica, alumina or another aluminosilicate. Before use as a catalyst or a catalyst support it is desirable to modify the crystalline aluminosilicate in one or a number of ways. Thus for many catalytic purposes it is preferred to reduce the alkali metal content of the aluminosilicate, suitably to a level of no more than 0.2% by weight, preferably to below 0.15% by weight. This may be achieved by subjecting the aluminosilicate to one or more ion-exchanges with a solution containing suitable cations. For example, the aluminosilicate may be ion-exchanged with a solution containing ammonium cations and thereafter calcined to produce the active hydrogen-form of the aluminosilicate. It is an advantage of the method of the present invention that the crystalline aluminosilicates produced thereby do not require calcination before ion-exchange, as do crystalline aluminosilicates produced from the bulky quaternary ammonium compounds. Before ion-exchange it may be preferable to treat the aluminosilicate with a solution of an acid, e.g. an aqueous mineral acid. Before catalytic use it is preferred to activate the crystalline aluminosilicate suitably by heating in air at a temperature in the range 400° to 700° C. for a period of from 2 to 48 hours.

Further the aluminosilicate may be impregnated with a compound of one or more metals, preferably with a compound of one or more metals belonging to Groups IB, IIB, IIIA, IVA, VA or VIII of the Periodic Table of the Elements as published in the Handbook of Chemistry and Physics. Suitable metals include copper, silver, zinc, gallium, indium, thallium, lead, antimony, bismuth, iron, cobalt, nickel, ruthenium, rhodium, palladium, iridium and platinum. The impregnated aluminosilicate preferably contains from 0.1 to 5.0% by weight of the metal(s). The compounds of the metals used are suitably those compounds which will decompose on the application of heat to form the corresponding oxides and which are soluble in water, e.g. the nitrates or chlorides. The aluminosilicates may thus be impregnated with an aqueous solution of a compound of the desired metal and the impregnated mass thereafter calcined to produce the metal oxide 'in situ' deposited in the interstices of the aluminosilicate structure. Alternatively or in addition the metal or metals may be incorporated by ion-exchange. In a further embodiment of the invention the aluminosilicate employed additionally contains one or more non-metallic elements belonging to Groups IIIA and VA of the Periodic Table, especially boron and phosphorus. The non-metallic element may be incorporated into the aluminosilicate by treatment with a suitable compound containing the non-metallic element, e.g. phosphoric acid, trimethyl-phosphate or phosphorus trichloride followed by heating. The amount of the non-metallic element present in the impregnated aluminosilicate preferably ranges from 0.1 to 5.0% by weight.

The aluminosilicate so-prepared, with or without the hereinbefore described treatments and/or modifications, may be used as catalysts in the form of a fixed or a fluidised bed in alkylation, dehydrocyclodimerisation, oligomerisation, isomeristion and hydrogenation reactions. Additionally the aluminosilicates may be used as catalysts in the dehydration of alcohols and ethers.

The following Examples and Comparison Tests are given for the purpose of illustrating the invention.

In the Examples and Comparison Test 1 reference will be made to the following.

X-ray diffraction (XRD) patterns

These were determined by a technique based on the method described in "X-Ray Diffraction Procedures. For Polycrystalline and Amorphous Materials" by H P Klug and L E Alexander, 2nd Edition, published by John Wiley and Sons, New York - London, using as the radiation the K-alpha doublet of copper.

Raman spectra

These were determined by a method based on that described in ▸Raman Spectroscopy. Theory and Practice", Edited by H A Szymanski, published by Plenum, N.Y., on samples from which any organic matter had been removed.

Elemental composition (i) Silicon and aluminium

Silicon and aluminium were determined by X-ray fluorescence analysis (XRF) using a method based on that described in "Advances in X-ray analysis" by F. Claisse and C Samson, 1961, Vol. 5, page 335, published in New York by Plenum.

(ii) Sodium

Sodium was determined by atomic absorption spectroscopy (AAS) using a method based on that described in "Analytical Atomic Absorption Spectroscopy" by W J Price, published in London, N.Y. and Theine by Heyden and Son Ltd.

(iii) Nitrogen (a) Total nitrogen was determined by chemiluminescence measurement after oxidative pyrolysis of the sample and reaction with ozone.

(b) Cationic nitrogen was determined by a development of the method described in "Extraction and Determination of Polyoxyethylene Alkyl Ester Surfactants in Water at Trace Levels" by L Fauretts, B Strancher and F Tunis, Analyst, September 1978, Vol. 103, pages 955–962. In brief, the sample structure was destroyed by heating with hydrofluoric acid and any quaternary nitrogen compounds extracted with water. At low ppm levels the nitrogen was determined calorimetrically by measuring the dichloroethane soluble picrate complex. At higher levels the nitrogen content was measured by the two phase Epton procedure, i.e. by titration with a standard anionic surfactant using a mixed indicator solution.

Of the Examples, nos. 1–11 demonstrate methods of preparing crystalline aluminosilicates using diethanolamine and nos 12 and 13 demonstrate methods using triethanolamine. In addition nos. 10 and 11 show that aluminosilicates prepared using diethanolamine do not contain organic cations whereas Comparison Test 1 describes the preparation of a ZSM-5 zeolite using tetrapropylammonium hydroxide as outlined in U.S. Pat. No. 3,702,866 to Mobil Oil Corporation and shows that the zeolite does contain organic cations. Nos. 14 to 22 demonstrate that aluminosilicates prepared as described in nos. 1 to 13 are active catalysts for the dehydration of methanol and for hydrocarbon conversion reactions. No. 24 and Comparison Test 2 compare the activity of an aluminosilicate prepared using diethanolamine with one prepared using tetrapropylammonium hydroxide for the dehydrocyclodimerisation of propane to aromatics.

EXAMPLE 1

Alumina, Laporte Type A (1.7 g, 0.017 mole) was dissolved in a hot solution of sodium hydroxide (2.6 g, 0.065 mole) in deionised water (25 g, 1.389 mole). To this was added a mixture of Ludox colloidal silica (100 g, containing 30% silica, 0.5 mole) in a solution of diethanolamine (25 g, 0.238 mole) dissolved in deionised water (75 g, 4.167 mole).

The mixture was then placed in a revolving stainless steel pressure vessel and heated at 170° C. for 48 hours. The resultant solid product was filtered and washed with deionised water (500 ml). The filter-cake was suspended in an aqueous solution of ammonia (100 ml 910 ammonia solution/100 ml deionised water) and stirred for one hour. The mixture was filtered and the solid washed with deionised water (500 ml) and dried at 120° C. for 16 hours. The aluminosilicate prepared was crushed to pass 16 mesh (BSS) and activated by heating in air at 500° C. for 16 hours. X-ray diffraction analysis of a sample of the final (crushed and activated) product showed it to be a crystalline material with an X-ray pattern shown in Table 1.

EXAMPLE 2

Alumina, Laporte Type A (1.7 g, 0.017 mole) was dissolved in a hot solution of sodium hydroxide (2.6 g, 0.065 mole) in deionised water (25 g, 1.389 mole). To this was added a mixture of Ludox colloidal silica (100 g, containing 30% silica, 0.5 mole) in a solution of diethanolamine (50 g, 0.476 mole) dissolved in deionised water (75 g, 4.167 mole)..

The mixture was then placed in a revolving stainless steel pressure vessel and heated at 170° C. for 96 hours. The resultant solid product was filtered and washed with deionised water (500 ml). The filter-cake was suspended in an aqueous solution of ammonia (100 ml 910 ammonia solution/100 ml deionised water) and stirred for one hour. The mixture was filtered and the solid washed with deionised water (500 ml) and dried at 120° C. for 16 hours. The aluminosilicate was crushed to pass 16 mesh (BSS) and calcined at 500° for 16 hours in air. X-ray diffraction analysis of the final (crushed and calcined) product showed it to be a crystalline material having an X-ray pattern essentially the same as that shown in Table 1.

EXAMPLE 3

Alumina, Laporte Type A (1.7 g, 0.017 mole) was dissolved in a hot solution of sodium hydroxide (2.6 g, 0.065 mole) in deionised water (25 g, 1.389 mole). To this was added a mixture of Ludox colloidal silica (100 g, containing 30% silica, 0.5 mole) in a solution of diethanolamine (12.5 g, 0.119 mole) dissolved in deionised water (75 g, 4.167 mole).

The mixture was then placed in a revolving stainless steel pressure vessel and heated at 170° C. for 48 hours. The resultant solid product was filtered and washed with deionised water (500 ml). The filter-cake was suspended in an aqueous solution of ammonia (100 ml 910 ammonia solution/100 ml deionised water) and stirred for one hour. The mixture was filtered and the solid washed with deionised water (500 ml) and dried at 120° C. for 16 hours. The aluminosilicate prepared was crushed to pass 16 mesh (BSS) and calcined at 500° C. for 16 hours in air. X-ray diffraction analysis of the final (crushed and calcined) product showed it to be a crystalline material having an X-ray pattern essentially the same as that shown in Table 1.

EXAMPLE 4

Alumina, Laporte Type A (3.4 g, 0.033 mole) was dissolved in a hot solution of sodium hydroxide (5.2 g, 0.13 mole) in deionised water (50 g, 2.778 mole). To this was added a mixture of Ludox colloidal silica (200 g, containing 30% silica, 1.0 mole) in a solution of diethanolamine (100 g, 0.952 mole) dissolved in deionised water (150 g, 8.333 mole).

The mixture was then placed in a revolving stainless steel pressure vessel and heated at 170° C. for 96 hours. The resultant solid product was filtered and washed with deionised water (1000 ml). The filter-cake was suspended in an aqueous solution of ammonia (200 ml, 910 ammonia solution/100 ml deionised water) and stirred for one hour. The mixture was filtered and the solid washed with deionised water (1000 ml) and dried at 120° C. for 16 hours. The aluminosilicate was crushed to pass 16 mesh (BBS) and calcined by heating in air at 500° C. for 16 hours. X-ray diffraction analysis of the final (crushed and calcined) product showed it to be a crystalline material with an X-ray pattern essentially the same as that shown in Table 1.

EXAMPLE 5

Sodium aluminate (0.9 g, Technical grade) was dissolved in a solution of sodium hydroxide (4.3 g, 0.108 mole) in deionised water (57.5 g, 3.194 mole).

Silica, Davison grade 59 (18 g, 0.3 mole, >16 mesh BSS) was mixed with diethanolamine (20 g, 0.191 mole) and deionised water (250 ml, 13.889 mole).

The solutions were mixed and stirred for 2 hours and then placed in a revolving pressure vessel and heated at 170° C. for 6 days. The mixture was cooled to room temperature, filtered and washed with deionised water (200 ml). The aluminosilicate was dried at 120° C. and calcined at 500° C. for 10 hours in air. X-ray diffraction analysis of the final (calcined) product showed it to be a crystalline material with an X-ray pattern essentially the same as that shown in Table 1.

EXAMPLE 6

Sodium aluminate (0.9 g; sodium aluminate 89 to 91% wt/wt, free sodium hydroxide 2.5 to 3.8 %, water 4 to 5%; 0.005 mole) was dissolved in a solution of sodium hydroxide (4.3 g, 0.108 mole) in deionised water (57.5 g, 3.194 mole).

Ludox colloidal silica (60 g, containing 30% silica, 0.3 mole) was mixed with diethanolamine (20 g, 0.191 mole) and deionised water (210 g, 11.667 mole).

The solutions were mixed and stirred for 2 hours and then placed in a revolving pressure vessel and heated at 170° C. for 6 days. The mixture was cooled to room temperature, filtered and washed with deionised water (200 ml). The aluminosilicate was dried at 120° C. and calcined at 500° C. for 10 hours in air. X-ray diffraction analysis of the final (calcined) product showed it to be a crystalline material with an X-ray pattern essentially the same as that shown in Table 1.

EXAMPLE 7

Sodium aluminate (0.9 g; sodium aluminate 89 to 91% wt/wt, free sodium hydroxide 2.5 to 3.8%, water 4 to 5%; 0.005 mole) was dissolved in a solution of sodium hydroxide (4.3 g, 0.108 mole) in deionised water (57.5 g, 3.194 mole).

Ludox colloidal silica (54 g, containing 30% silica, 0.27 mole) was mixed with diethanolamine (5.1 g, 0.049 mole) and deionised water (200 ml, 11.111 mole).

The solutions were mixed, placed in a revolving pressure vessel and heated at 170° C. for 65 hours. The mixture was cooled to room temperature, filtered and washed with deionised water (300 ml). The aluminosilicate was ion-exchanged by heating with a 10% ammonium chloride solution (150 ml) at 70°–80° C. for one hour. This operation was repeated twice.

The mixture was filtered and the solid washed with deionised water (300 ml) and dried at 120° C. for 16 hours. The aluminosilicate prepared was crushed to pass 16 mesh (BSS) and calcined by heating in air at 500° C. for 16 hours. X-ray diffraction analysis of the final (crushed and calcined) product showed it to be a crystalline material with an X-ray pattern essentially the same as that shown in Table 1. The following analyses were obtained:

Wt. percent aluminium=2.06
Wt. percent silicon=41.9

EXAMPLE 8

Alumina, Laporte Type A (1.3 g, 0.013 mole) was dissolved in a hot solution of sodium hydroxide (1.95 g, 0.049 mole) in deionised water (18.8 g, 1.044 mole). To this was added a mixture of Ludox colloidal silica (75 g, containing 30% silica, 0.375 mole) in a solution of diethanolamine (18.8 g, 0.179 mole) dissolved in deionised water (56.3 g, 3.128 mole).

The mixture was then placed in a revolving stainless steel pressure vessel and heated at 170° C. for 66 hours. The resultant solid product was filtered and washed with deionised water (300 ml). The filter-cake was then ion-exchanged by heating with a 1 molar ammonium chloride solution (250 ml) at 70°–80° C. for one hour. This operation was repeated twice. The mixture was filtered and the solid washed with deionised water (250 ml) and dried at 120° C. for 16 hours. The aluminosilicate prepared was crushed to pass 16 mesh (BSS) and calcined at 500° C. for 16 hours. X-ray diffraction analysis of the final (crushed and calcined) product showed it to be a crystalline material with an X-ray pattern essentially the same as that shown in Table 1.

The following analyses were obtained:
Wt. percent silicon=42
Wt. percent aluminium=1.97
Wt. percent solution=0.05

EXAMPLE 9

Example 1 was repeated but the crystallisation was carried out at 125° C. and for 70 hours. X-ray diffraction analysis of the sample showed it to be a mixture of a crystalline material having an X-ray pattern essentially the same as that shown in Table 1 and amorphous material.

EXAMPLE 10

Example 1 was repeated but the preparation was scaled up by a factor of 4 and the crystallisation was carried out for 60 hours. X-ray diffraction analyses of the product before and after calcination at 500° C. for 16 hours in air are given in Tables 2 and 3 respectively. These show that the product is a crystalline material having an X-ray pattern essentially the same as that shown in Table 1 and containing some quartz. The Raman spectrum of the product after calcination is given in FIG. 1. The product before calcination had the following analysis:

Wt. percent silicon=40.6
Wt. percent aluminium=3.0
Wt. percent sodium=0.31
Wt. percent nitrogen=1.4
Wt. percent carbon=5.1
Nitrogen present as cations<10 ppm.

EXAMPLE 11

Sodium aluminate (12.4 g, sodium aluminate 89 to 91% wt/wt, free sodium hydroxide 2.5 to 3.8%, water 4 to 5%; 0.07 mole) was dissolved in a solution of sodium hydroxide (4.43 g, 0.111 mole) in deionised water (200 g, 11.11 mole). The solution was filtered and then added to diethanolamine (116.1 g, 1.106 mole) at 40° C. Ludox colloidal silica (317.3 g, containing 40% silica, 2.115 mole) dissolved in deionised water (176.4 g, 9.8 mole) was then added with stirring and stirring was continued for a further 30 minutes. The mixture was transferred to a one liter autoclave and heated at 170° C. for 7 days. The pressure recorded was 10 bar. The mixture was cooled to room temperature, filtered and the solid washed with deionised water (1000 ml) and dried at 120° C. for 16 hours. X-ray diffraction analyses of the product before and after calcination at 500° C. for 16 hours in air are given in Tables 4 and 5 respectively. These show that the product before and after calcination is a crystalline material having an X-ray pattern essentially the same as that shown in Table 1 and contains some quartz.

Figure 3:
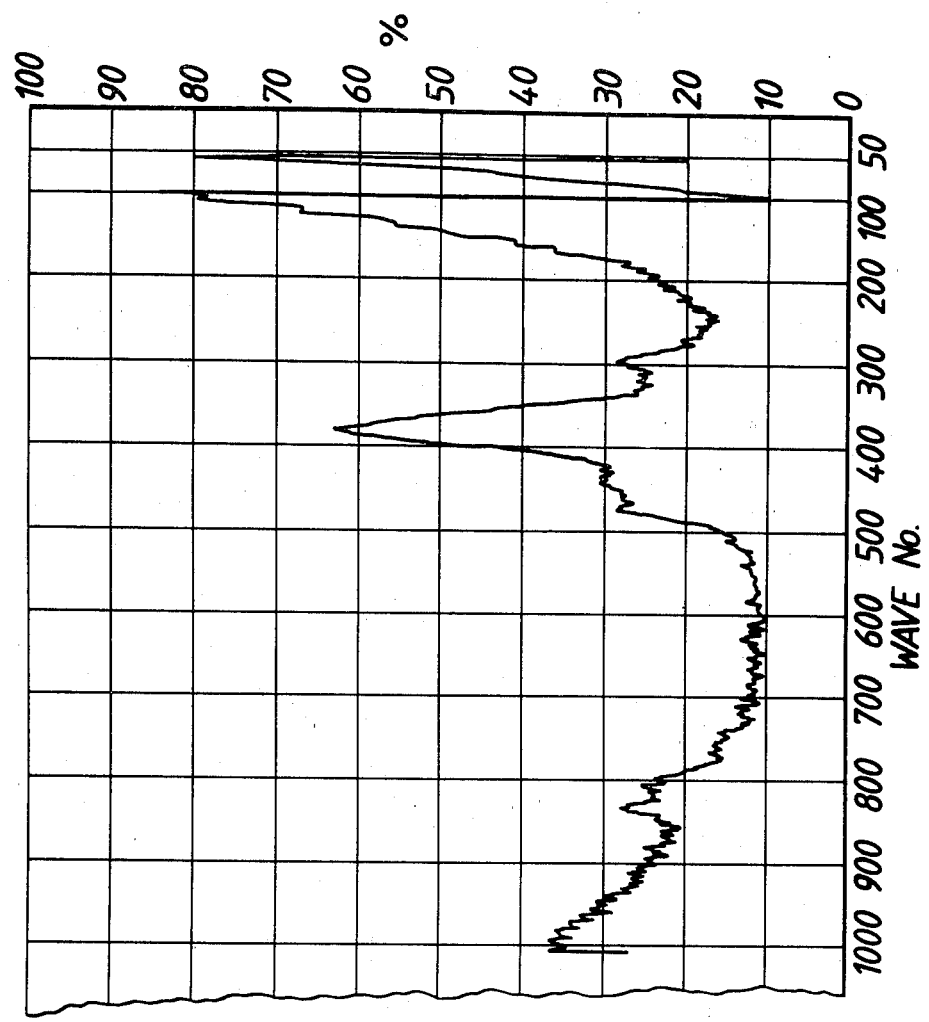

The product before calcination had the following analysis:
wt. percent silica=39.0
wt. percent aluminium=2.7
wt. percent sodium=0.45
wt. percent nitrogen=1.3
wt. percent carbon=4.0
Nitrogen present as cations 2 ppm
The Raman spectrum for the product after calcination is given in FIG. 3.

EXAMPLE 12

Alumina, Laporte Type A (1.7 g., 0.017 mole) was dissolved in a hot solution of sodium hydroxide (2.6 g., 0.065 mole) in deionised water (25 g., 1.389 mole). To this was added a mixture of Ludox colloidal silica (100 g., containing 30% silica, 0.5 mole) in a solution of triethanolamine (25 g., 0.172 mole) dissolved in deionised water (75 g., 4.167 mole).

The resultant mixture was then placed in a revolving stainless steel pressure vessel and heated at 170° C. for 48 hours. The resultant solid product was filtered and washed with deionised water (500 ml). The filter-cake was suspended in an aqueous solution of ammonia and stirred for one hour. The mixture was filtered and the solid washed with deionised water (500 ml) and dried at 120° C. for 16 hours. The aluminosilicate prepared was crushed to pass 16 mesh (BSS) and activated by heating in air at 500° C. for 16 hours. X-ray diffraction analysis of the final (crushed and activated) product showed it to be a crystalline material with an X-ray pattern eventially the same as that shown in Table 1.

EXAMPLE 13

Alumina, Laporte Type A (1.3 g. 0.013 mole) was dissolved in a hot solution of sodium hydroxide (1.95 g. 0.049 mole) in deionised water (18.8 g., 1.044 mole). To this was added a mixture of Ludox colloidal silica (75 g., containing 30% silica, 0.375 mole) in a solution of triethanolamine (26.7 g., 0.184 mole) dissolved in deionised water (56.3 g., 3.128 mole).

The mixture was then placed in a revolving stainless steel pressure vessel and heated at 170° C. for 66 hours. The resultant solid product was filtered and washed with deionised water (300 ml). The filter-cake was then ion-exchanged by heating with a 1 molar ammonium chloride solution (250 ml) at 70°–80° C. for 1 hour. This operation was repeated twice. The mixture was filtered and the solid washed with deionised water (250 ml) and dried at 120° C. for 16 hours. The aluminosilicate prepared was crushed to pass 16 mesh (BSS) and calcined at 500° C. for 16 hours. X-ray diffraction analysis of the final (crushed and calcined) product showed it to be a crystalline material with an X-ray pattern essentially the same as that shown in Table 1.

The following analyses were obtained:
wt. percent silicon=43
wt. percent aluminium=1.92
wt. percent sodium=less than 0.01

EXAMPLE 14

The aluminosilicate prepared as described in Example 1 was tested for the conversion of methanol into hydrogen.

A gaseous feed of methanol was passed over the activated aluminosilicate contained in a heated quartz reactor. The reaction conditions, the methanol conversion and the yields of ethylene, $C_3$ and $C_4$ hydrocarbons are given in Table 6. The terms used in the Table are defined as follows:

$$\text{Contact time} = \frac{\text{Volume of catalyst in mls}}{\text{Total volume of gas (in mls/sec at } NTP\text{)}}$$

$$\text{Molar Yield} = \frac{\text{Moles of ethanol converted to a particular product}}{\text{Total moles methanol fed}} \times 100$$

EXAMPLE 15

Example 14 was repeated using the aluminosilicate prepared as described in Example 2 in place of that prepared as described in Example 1. The reaction conditions, the methanol conversion and the yields of ethylene, $C_3$ and $C_4$ hydrocarbons are given in Table 6.

EXAMPLE 16

Example 14 was repeated using the aluminosilicate prepared as described in Example 3 in place of that prepared as described in Example 1. The reaction conditions, the methanol conversion and the yields of ethylene, $C_3$ and $C_4$ hydrocarbons are given in Table 6.

EXAMPLE 17

20 g of the aluminosilicate prepared by the method of Example 4 was mixed with 20 g LUDOX colloidal silica (containing 30% by weight silica) evaporated to dryness on a steam-bath and finally dried at 120° C. The mixture was then broken down to pass 5–8 mesh (BSS) and calcined in air at 500° C. for 16 hours.

The activity of the catalyst was tested as described in Example 14. The reaction conditions, the methanol conversion and the yields of ethylene, $C_3$ and $C_4$ hydrocarbons are given in Table 6.

EXAMPLE 18

10 g of aluminosilicate prepared as described in Example 8 was mixed with 10 g LUDOX colloidal silica (containing 30% by weight silica) and the suspension evaporated to dryness on a steam-bath and finally dried at 120° C. The solid was then broken down to form 5–16 mesh (BSS) granules.

The catalyst was tested for the dehydrocyclodimerisation of C₃-hydrocarbon mixtures to aromatics. A gaseous feed of a C₃-hydrocarbon mixture (78.1% v/v propane, 19.1% v/v propylene, 2.8% v/v ethane) was passed over the catalyst contained in a heated tube and the product collected and analysed.

The conditions used and the results obtained are given in Table 7. The terms used in the Table are defined as follows:

$$\text{Contact time} = \frac{\text{Volume of catalyst in mls}}{\text{Total volume of gas (in mls/sec at } NTP\text{)}}$$

$$C_3 \text{ conversion} = \frac{\text{Moles of } C_3\text{—hydrocarbon consumed}}{\text{moles of } C_3\text{—hydrocarbon fed}} \times 100$$

$$\text{Molar Yield} = \frac{\text{Moles of } C_3\text{—hydrocarbon converted to particular product}}{\text{Moles of } C_3\text{—hydrocarbon fed}} \times 100$$

$$\text{Selectivity} = \frac{\text{Moles of } C_3\text{—hydrocarbon converted to particular product}}{\text{Moles of } C_3\text{—hydrocarbon consumed}} \times 100$$

EXAMPLE 19

8.1 g of the granules of Example 18 were mixed with an aqueous gallium nitrate solution (6 ml., containing 0.05 g. gallium/ml) and the whole evaporated to dryness on a steam-bath. The solid was dried at 120° C. for 16 hours and activated by heating in air at 500° C. for 16 hours.

The activity of the catalyst was tested as described in Example 18. The reaction conditions, and the yields obtained are given in Table 7.

EXAMPLE 20

10 g of aluminosilicate prepared as described in Example 10 was mixed with 10 g Ludox colloidal silica (containing 30% by weight silica) and the suspension evaporated to dryness on a steam-bath and finally dried at 120° C. The solid was then broken down to form 5–16 mesh (BSS) granules and activated by calcining in air at 500° C. for 5 hours.

The catalyst was tested as described in Example 18 and the conditions used and the results obtained are given in Table 7.

EXAMPLE 21

Example 14 was repeated using the aluminosilicate prepared as described in Example 12 in place of that described in Example 1. The reaction conditions, the methanol conversion and the yields of ethylene, C₃ and C₄ hydrocarbons are given in Table 6.

EXAMPLE 22

10 g of aluminosilicate prepared as described in Example 13 was mixed with 10 g Ludox colloidal silica (containing 30% by weight silica) and the suspension evaporated to dryness on a steam-bath and finally dried at 120° C. The solid was then broken down to form 5–16 mesh (BSS) granules and activated by calcining in air at 500° C. for 5 hours.

The catalyst was tested as described in Example 18 and the conditions used and the results obtained are given in Table 7.

Comparison Test 1

Davison silica, grade 59 (68.7 g, 1.145 mole) was dissolved in an aqueous tetrapropylammonium hydroxide (TPA) solution (600 ml, containing 20% TPA) at 100° C. with stirring. The solution was cooled to room temperature.

Laporte type A alumina (4.02 g., 0.039 mole) was dissolved in a hot solution of sodium hydroxide (4.38 g., 0.11 mole) in deionised water (15 g., 0.833 mole). The two solutions were mixed and the resulting mixture was transferred to a one liter stirred autoclave and heated at 150° C. for 6 days. The mixture was cooled to room temperature, filtered and the filter-cake washed by resuspension and stirring in deionised water (2×500 ml). The solid product was dried at 120° C. for 16 hours. X-ray powder diffraction analysis of the material showed it to be a ZSM-5 zeolite as described in U.S. Pat. No. 3,702,886 to Mobil Oil Corporation.

Figure 4:
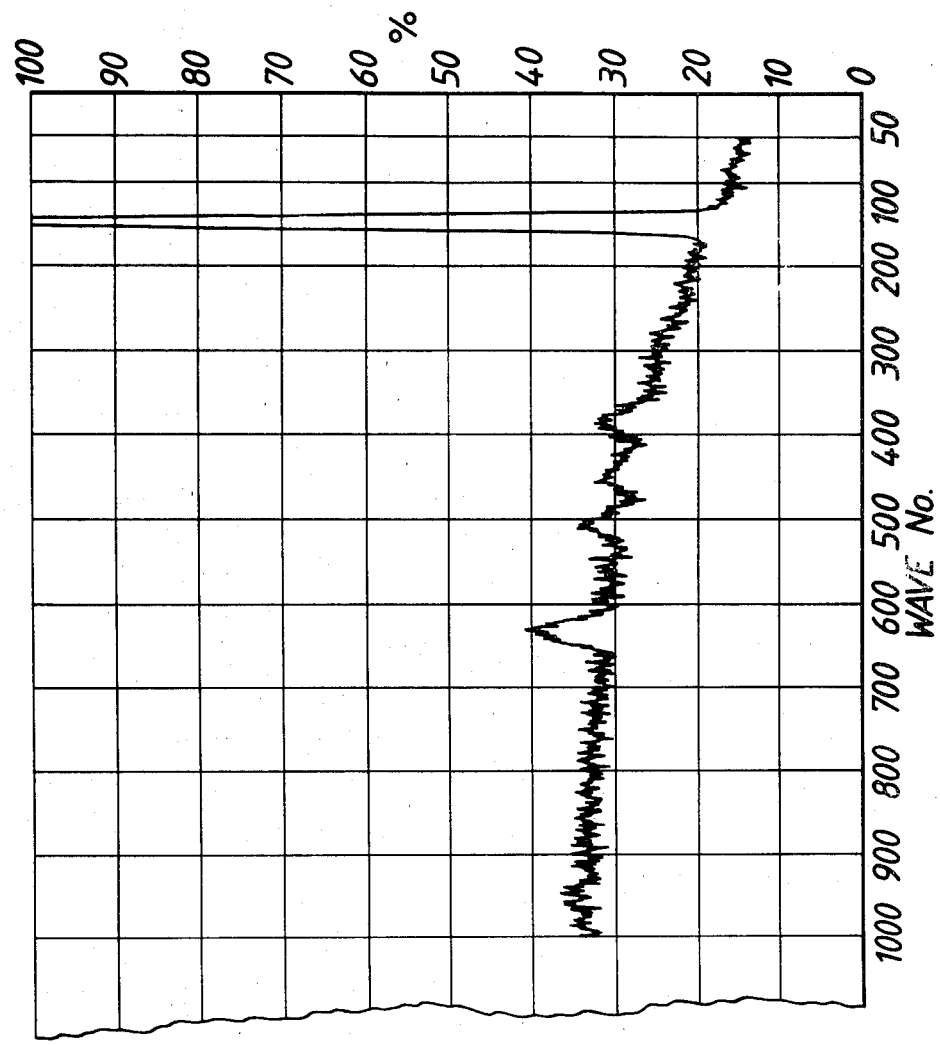

The following analyses were obtained:
wt. percent silicon = 39.6
wt. percent aluminium = 4.2
wt. percent sodium = 0.22
wt. percent nitrogen = 0.6
wt. percent carbon = 6.1
Nitrogen present as cations 6000 ppm
The Raman spectrum for the sample is given in FIG. 4.

This is not an example according to the invention, because tetrapropylammonium hydroxide was used in place of a di- or trialkanolamine, and is included only for the purpose of comparison.

EXAMPLE 24

Figure 2:
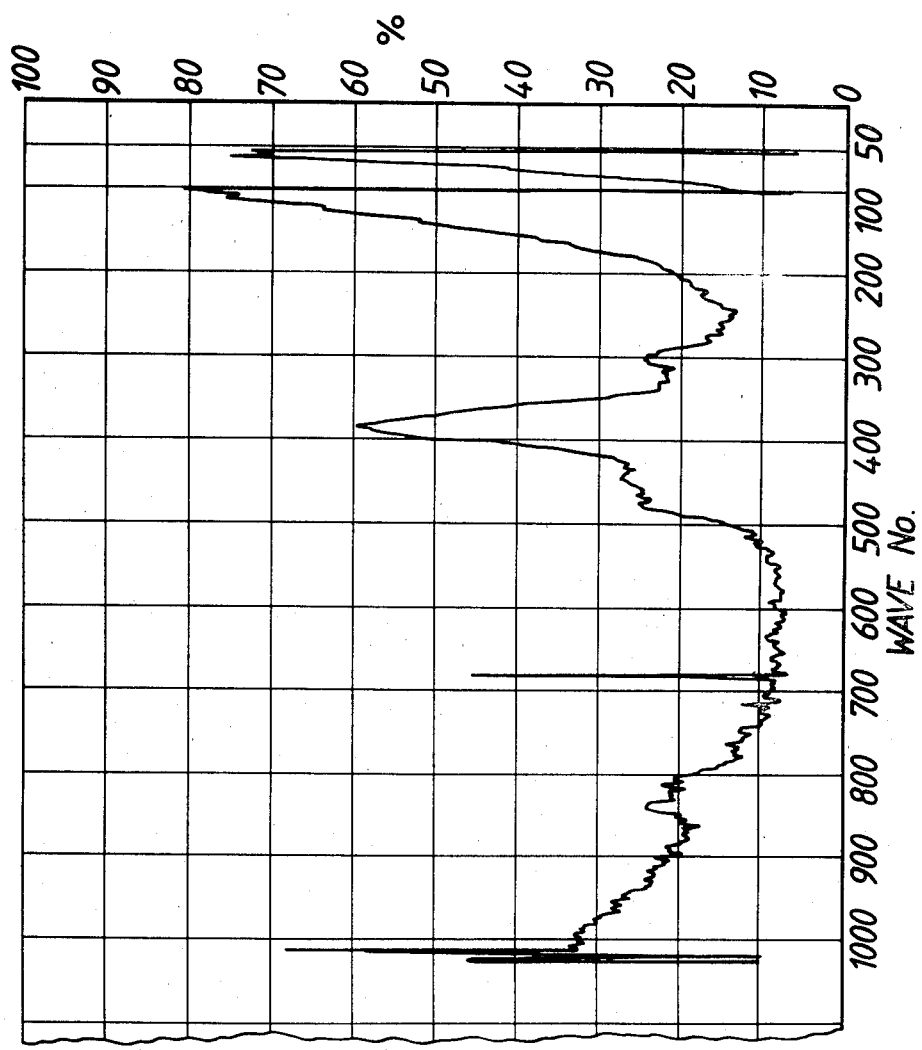

The aluminosilicate (20 g) prepared as described in Example 10 was ion-exchanged by heating with a 1 molar ammonium chloride solution (250 ml) at 70°–80° C. for 1 hour. This operation was repeatd twice. The mixture was filtered and the solid washed with deionised water (250 ml) and dried at 120° C. for 16 hours. The solid cake was then broken down to pass 5–8 mesh (BSS) granules and calcined at 500° C. in air for 16 hours. The Raman spectrum for the broken down and calcined sample is given in FIG. 2.

The catalytic activity of the aluminosilicate was tested as described in Example 18 and the conditions used and the results obtained are given in Table 7.

Comparison Test 2

The aluminosilicate (10 g) prepared as described in Comparison Test 1 was ion-exchanged by heating with a 1 molar ammonium chloride solution (125 ml) at 70°–80° C. for 1 hour. This operation was repeated twice. The mixture was filtered and the solid washed with deionised water (250 ml) and dried at 120° C. for 16 hours. The dry product was mixed with 10 g LUDOX colloidal silica (containing 30% by weight silica) and the suspension evaporated to dryness on a steam-bath and finally dried at 120° C. The solid cake was broken down to pass 5–8 mesh (BSS) granules and calcined at 500° C. in air for 16 hours.

The activity of the aluminosilicate so-obtained was tested as described in Example 18 and the conditions used and the results obtained are given in Table 7.

TABLE 1

| 2-THETA | INTERPLANAR SPACINGS d(Angstrom) | RELATIVE INTENSITIES I/Io |
|---------|----------------------------------|---------------------------|
| 7.84    | 11.282                           | 100                       |
| 8.73    | 10.132                           | 58                        |
| 8.98    | 9.848                            | 15                        |

TABLE 1-continued

| 2-THETA | INTERPLANAR SPACINGS d(Angstrom) | RELATIVE INTENSITIES I/Io |
|---|---|---|
| 13.09 | 6.763 | 5 |
| 13.82 | 6.406 | 10 |
| 14.68 | 6.034 | 14 |
| 15.39 | 5.756 | 8 |
| 15.81 | 5.605 | 10 |
| 17.53 | 5.060 | 5 |
| 17.72 | 5.006 | 5 |
| 19.13 | 4.639 | 4 |
| 20.24 | 4.388 | 6 |
| 20.76 | 4.279 | 9 |
| 22.07 | 4.028 | 5 |
| 22.98 | 3.871 | 76 |
| 23.17 | 3.838 | 54 |
| 23.61 | 3.769 | 25 |
| 23.83 | 3.734 | 34 |
| 24.28 | 3.666 | 21 |
| 25.44 | 3.502 | 4 |
| 25.79 | 3.454 | 6 |
| 26.47 | 3.367 | 6 |
| 26.84 | 3.321 | 7 |
| 29.15 | 3.063 | 8 |
| 29.77 | 3.001 | 9 |
| 29.95 | 2.983 | 8 |
| 30.24 | 2.956 | 4 |

TABLE 2

| 2-THETA | INTERPLANAR SPACINGS d(Angstrom) | RELATIVE INTENSITIES I/Io |
|---|---|---|
| 7.83 | 11.296 | 59 |
| 8.72 | 10.143 | 45 |
| 8.98 | 9.847 | 12 |
| 13.08 | 6.767 | 6 |
| 13.80 | 6.416 | 7 |
| 14.43 | 6.138 | 6 |
| 14.65 | 6.045 | 8 |
| 15.40 | 5.754 | 7 |
| 15.78 | 5.615 | 6 |
| 17.51 | 5.065 | 4 |
| 17.68 | 5.018 | 4 |
| 19.11 | 4.643 | 6 |
| 20.23 | 4.391 | 12 |
| 20.71 | 4.289 | 10 |
| 21.63 | 4.108 | 4 |
| 22.03 | 4.034 | 7 |
| 22.40 | 3.969 | 8 |
| 22.94 | 3.878 | 100 |
| 23.15 | 3.843 | 69 |
| 23.55 | 3.777 | 40 |
| 23.79 | 3.740 | 48 |
| 24.26 | 3.669 | 25 |
| 24.64 | 3.612 | 4 |
| 25.43 | 3.503 | 7 |
| 25.74 | 3.461 | 10 |
| 26.06 | 3.420 | 4 |
| 26.21 | 3.400 | 4 |
| 26.44 | 3.371 | 7 |
| 26.68 | 3.341 | 8 |
| 26.81 | 3.325 | 8 |
| 27.18 | 3.281 | 4 |
| 27.29 | 3.267 | 4 |
| 29.12 | 3.066 | 9 |
| 29.74 | 3.004 | 13 |
| 30.21 | 2.958 | 4 |

TABLE 3

| 2-THETA | INTERPLANAR SPACINGS d(Angstrom) | RELATIVE INTENSITIES I/Io |
|---|---|---|
| 7.85 | 11.259 | 100 |
| 8.76 | 10.098 | 64 |
| 9.01 | 9.818 | 19 |
| 11.83 | 7.481 | 4 |
| 13.12 | 6.747 | 6 |

TABLE 3-continued

| 2-THETA | INTERPLANAR SPACINGS d(Angstrom) | RELATIVE INTENSITIES I/Io |
|---|---|---|
| 13.84 | 6.400 | 11 |
| 14.56 | 6.086 | 17 |
| 14.70 | 6.025 | 15 |
| 15.45 | 5.737 | 10 |
| 15.83 | 5.597 | 12 |
| 17.55 | 5.053 | 6 |
| 17.73 | 5.002 | 6 |
| 19.15 | 4.634 | 5 |
| 20.26 | 4.382 | 8 |
| 20.47 | 4.277 | 10 |
| 22.10 | 4.022 | 5 |
| 23.00 | 3.868 | 96 |
| 23.21 | 3.833 | 67 |
| 23.62 | 3.766 | 39 |
| 23.84 | 3.733 | 43 |
| 24.30 | 3.662 | 26 |
| 25.48 | 3.495 | 5 |
| 25.80 | 3.453 | 8 |
| 26.11 | 3.413 | 4 |
| 26.27 | 3.392 | 6 |
| 26.51 | 3.362 | 8 |
| 26.81 | 3.325 | 9 |
| 28.88 | 3.092 | 4 |
| 29.19 | 3.060 | 10 |
| 29.78 | 3.000 | 12 |
| 29.92 | 2.987 | 12 |
| 30.27 | 2.952 | 6 |

TABLE 4

| 2-THETA | INTERPLANAR SPACINGS d(Angstrom) | RELATIVE INTENSITIES I/Io |
|---|---|---|
| 7.81 | 11.317 | 74 |
| 8.71 | 10.155 | 48 |
| 8.96 | 9.866 | 16 |
| 11.78 | 7.515 | 4 |
| 13.07 | 6.772 | 6 |
| 13.79 | 6.423 | 9 |
| 14.46 | 6.124 | 8 |
| 14.64 | 6.052 | 10 |
| 15.39 | 5.757 | 9 |
| 15.77 | 5.619 | 9 |
| 17.48 | 5.073 | 4 |
| 17.68 | 5.018 | 5 |
| 19.10 | 4.646 | 7 |
| 20.21 | 4.394 | 12 |
| 20.71 | 4.289 | 16 |
| 21.61 | 4.113 | 4 |
| 22.03 | 4.035 | 7 |
| 22.38 | 3.972 | 4 |
| 22.92 | 3.880 | 100 |
| 23.15 | 3.843 | 67 |
| 23.56 | 3.776 | 42 |
| 23.78 | 3.741 | 50 |
| 24.25 | 3.670 | 29 |
| 24.60 | 3.619 | 4 |
| 25.42 | 3.505 | 7 |
| 25.73 | 3.462 | 11 |
| 26.05 | 3.402 | 5 |
| 26.50 | 3.364 | 26 |
| 26.81 | 3.325 | 10 |
| 27.24 | 3.274 | 5 |
| 29.10 | 3.069 | 10 |
| 29.71 | 3.007 | 14 |
| 29.89 | 2.989 | 13 |
| 30.20 | 2.960 | 5 |

TABLE 5

| 2-THETA | INTERPLANAR SPACINGS d(Angstrom) | RELATIVE INTENSITIES I/Io |
|---|---|---|
| 7.31 | 12.095 | 13 |
| 7.84 | 11.284 | 100 |
| 8.73 | 10.127 | 58 |

TABLE 5-continued

| 2-THETA | INTERPLANAR SPACINGS d(Angstrom) | RELATIVE INTENSITIES I/Io |
|---|---|---|
| 8.99 | 9.838 | 18 |
| 11.80 | 7.498 | 4 |
| 13.10 | 6.761 | 6 |
| 13.81 | 6.411 | 12 |
| 14.67 | 6.040 | 14 |
| 15.42 | 5.748 | 10 |
| 15.79 | 5.611 | 12 |
| 17.53 | 5.060 | 5 |
| 17.71 | 5.008 | 6 |
| 19.13 | 4.639 | 5 |
| 20.24 | 4.388 | 8 |
| 20.75 | 4.281 | 15 |
| 22.06 | 4.029 | 6 |
| 22.96 | 3.873 | 87 |
| 23.18 | 3.837 | 61 |
| 23.59 | 3.772 | 34 |
| 23.81 | 3.737 | 41 |
| 24.29 | 3.665 | 27 |
| 25.45 | 3.500 | 6 |
| 25.77 | 3.457 | 8 |
| 26.08 | 3.416 | 5 |
| 26.53 | 3.360 | 26 |
| 26.82 | 3.324 | 10 |
| 29.14 | 3.064 | 10 |
| 29.75 | 3.003 | 12 |
| 29.93 | 2.985 | 11 |
| 30.24 | 2.955 | 5 |

TABLE 6

Conditions and Results

| Example | Contact time (secs at NTP) | Reaction Temperature (°C.) | % Yield on methanol fed C₂ | C₃ | C₄ | Methanol* Conversion (%) |
|---|---|---|---|---|---|---|
| 14 | 3.7 | 450 | 15 | 18 | 5 | 100 |
| 15 | 3.7 | 350 | 16 | 15 | 9 | 58 |
| 16 | 3.7 | 372 | 17 | 15 | 5 | 68 |
| 17 | 3.7 | 375 | 16 | 15 | 6 | 88 |
| 21 | 3.7 | 450 | 14 | 17 | 13 | 100 |

TABLE 7

Conditions and Results

| Ex | Hours on Stream | Reaction temp. (°C.) | Contact time (secs) | C₃ Conversion (%) | Molar Yields (%) CH₄ | C₂H₄ | C₂H₆ | Aromatics | Selectivity to Aromatics (%) | Composition of aromatics (% wt/wt) Benzene | Toluene | Xylenes |
|---|---|---|---|---|---|---|---|---|---|---|---|---|
| 18 | 1 | 550 | 16 | 39 | 9 | 9 | 3 | 18 | 46 | 28 | 47 | 14 |
| 19 | 2 | 550 | 16 | 42 | 4 | 2 | 5 | 31 | 74 | 26 | 48 | 19 |
| 20 | 1 | 550 | 13 | 72 | 21 | 5 | 10 | 36 | 50 | 27 | 41 | 18 |
| 22 | 1 | 550 | 17 | 55 | 14 | 5 | 9 | 27 | 49 | 22 | 42 | 20 |
| 24 | 2 | 550 | 13 | 70 | 21 | 5 | 10 | 34 | 49 | 27 | 41 | 18 |
| Comp test 2 | 2 | 550 | 16 | 60 | 19 | 7 | 12 | 22 | 37 | 19 | 41 | 22 |

We claim:

1. A method for preparing a crystalline aluminosilicate having a high silica to alumina molar ratio and an X-ray diffraction pattern substantially the same as that of ZSM-5 zeolite which method comprises mixing a source of silica, a source of alumina, a source of alkali metal, water and at least one alkanolamine according to Formula (I):

wherein any two of $R^1$, $R^2$ and $R^3$ are independently alkylol groups and the remaining one of $R^1$, $R^2$ and $R^3$ is a hydrogen atom or all of $R^1$, $R^2$ and $R^3$ are independently alkylol groups, the alkylol groups being —CH₂—R—OH, wherein R is —CH₂—, —CH₂CH₂—, or —CH(CH₃)—, the ratio of said source of silica to said source of alumina being at least 20:1 based on the equivalent moles of silica and alumina in said respective sources, maintaining said mixture at a temperature above about 120° C. and recovering the crystalline aluminosilicate formed.

2. A method according to claim 1 wherein said alkanolamine of formula (I) is diethanolamine.

3. A method according to claim 1 wherein said alkanolamine of formula (I) is triethanolamine.

4. A method according to claim 1 wherein said alkanolamine of formula (I) is dipropanolamine.

5. A method according to claim 1 wherein said alkanolamine of formula (I) is tripropanolamine.

6. A method for preparing a crystalline aluminosilicate having a high silica to alumina molar ratio and an X-ray diffraction pattern substantially the same as that of ZSM-5 zeolite which method comprises mixing a source of silica, a source of alumina, a source of alkali metal, water and the precursors of at least one alkanolamine according to formula (I) as defined in claim 1, said precursors consisting of ethylene oxide or propylene oxide and a nitrogen-containing compound having one or more hydrogen atoms attached to a nitrogen atom selected from the group consisting of ammonia, monoethanolamine, monopropanolamine, diethanolamine and dipropanolamine, the ratio of said source of silica to said source of alumina being at least 20:1 based on the equivalent moles of silica and alumina in said respective sources, maintaining said mixture at a temperature above about 120° C. and recovering the crystalline aluminosilicate formed.

7. A method according to claim 6 wherein said precursors consist of ethylene oxide and ammonia.

8. A method according to claim 6 wherein said precursors consist of propylene oxide and ammonia.

9. A method according to claim 6 wherein said precursors consist of ethylene oxide and monoethanolamine.

10. A method according to claim 6 wherein the molar ratio of said ethylene oxide or propylene oxide to said nitrogen-containing compound is in the range from 10:1 to 2:1.

11. A method according to either claim 1 or claim 6 wherein said temperature is in the range from 135° to 210° C.

12. A method according to either claim 1 or claim 6 wherein said temperature is in the range from 135° to 190° C.

13. A method according to either claim 1 or claim 6 wherein said crystalline aluminosilicate product is recovered after a time not less than 4 hours.

14. A method according to either claim 1 or claim 6 wherein said ratio of said sources of silica to said source of alumina is in the range from 20:1 to 150:1.

15. A method according to either claim 1 or claim 6 wherein said ratio of said source of silica to said source of alumina is from 20:1 to 100:1.

16. A method according to either claim 1 or claim 6 wherein the ratio of the number of mole equivalents of total silica and alumina in said sources of silica and alumina is in the range from 2:1 to 0.02:1.

17. A method according to either claim 1 or claim 6 wherein the ratio of the number of moles of said alkanolamine of formula (I) to the number of mole equivalents of total silica and alumina in said sources of silica and alumina is in the range from 10:1 to 0.02:1.

18. A method for preparing a crystalline aluminosilicate as defined in either claim 1 or claim 6 wherein the alkali metal content of said recovered crystalline aluminosilicate is reduced to a level of 0.2% by weight or less by subjecting it to one or more ion-exchanges.

19. A method for preparing a crystalline aluminosilicate as defined in either claim 1 or claim 6 wherein the active hydrogen-form of said recovered crystalline aluminosilicate is produced by ion-exchanging said crystalline aluminosilicate with a solution containing ammonium ions to form an ammonium ion-exchanged crystalline aluminosilicate and thereafter calcining said ammonium ion-exchanged crystalline aluminosilicate.

20. A method for preparing a crystalline aluminosilicate as defined in either claim 1 or claim 6 wherein said recovered crystalline aluminosilicate is activated by heating in air at a temperature in the range 400° to 700° C. for a period of from 2 to 48 hours.

21. A method for preparing a crystalline aluminosilicate as defined in either claim 1 or claim 6 wherein the crystalline aluminosilicate reaction product is impregnated with a compound of at least one metal selected from the group consisting of copper, silver, zinc, gallium, indium, thallium, lead, antimony, bismuth, iron, cobalt, nickel, ruthenium, rhodium, palladium, iridium and platinum.

22. A method for preparing a crystalline aluminosilicate as defined in either claim 1 or claim 6 wherein said recovered crystalline aluminosilicate is impregnated with a compound of gallium.

23. A method for preparing a crystalline aluminosilicate as defined in either claim 1 or claim 6 wherein said recovered crystalline aluminosilicate is treated with a suitable compound containing a non-metallic element selected from the group consisting of boron and phosphorus to incorporate said non-metallic element into the aluminosilicate.

* * * * *

UNITED STATES PATENT AND TRADEMARK OFFICE
CERTIFICATE OF CORRECTION

PATENT NO. : 4,407,728

DATED : October 4, 1983

INVENTOR(S) : WILLIAM J. BALL, KEITH W. PALMER and DAVID G. STEWART

It is certified that error appears in the above—identified patent and that said Letters Patent is hereby corrected as shown below:

Col. 3, l. 23, "supplified" should read --supplied--.

Col. 7, l. 6, delete the "b" before "Raman" and insert --"-- in lieu thereof.

Col. 7, l. 32, "ester" should read --ether--.

Col. 7, l. 44, after "methods" change "of" to --for--.

Col. 8, l. 36, insert --C-- after "500°".

Col. 9, l. 14, change "(BBS)" to read --(BSS)--

Col. 10, l. 41, "solution" should read --sodium--.

Signed and Sealed this

Fifth Day of June 1984

[SEAL]

Attest:

GERALD J. MOSSINGHOFF

Attesting Officer    Commissioner of Patents and Trademarks